(12) United States Patent
Egedal et al.

(10) Patent No.: US 11,732,692 B2
(45) Date of Patent: Aug. 22, 2023

(54) DEVICE AND METHOD OF DAMPING FRONT AND BACKWARD MOVEMENTS OF A TOWER OF A WIND TURBINE

(71) Applicant: Siemens Gamesa Renewable Energy A/S, Brande (DK)

(72) Inventors: Per Egedal, Herning (DK); Thomas Esbensen, Herning (DK); Gustav Hoegh, Vejle (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 46 days.

(21) Appl. No.: 17/311,715

(22) PCT Filed: Oct. 31, 2019

(86) PCT No.: PCT/EP2019/079816
§ 371 (c)(1),
(2) Date: Jun. 8, 2021

(87) PCT Pub. No.: WO2020/120010
PCT Pub. Date: Jun. 18, 2020

(65) Prior Publication Data
US 2022/0025860 A1  Jan. 27, 2022

(30) Foreign Application Priority Data

Dec. 13, 2018  (EP) .................... 18212389

(51) Int. Cl.
*F03D 7/02* (2006.01)
(52) U.S. Cl.
CPC ......... *F03D 7/0296* (2013.01); *F03D 7/0232* (2013.01); *F05B 2230/80* (2013.01); *F05B 2240/3052* (2020.08); *F05B 2270/334* (2013.01)

(58) Field of Classification Search
CPC ................ F03D 7/0296; F03D 7/0232; F05B 2240/3052; F05B 2270/334; Y02E 10/72
See application file for complete search history.

(56) References Cited

U.S. PATENT DOCUMENTS 4,435,647 A * 3/1984 Harner ................ F03D 7/0224
416/41
4,692,095 A  9/1987 Lawson-Tancred
(Continued)

FOREIGN PATENT DOCUMENTS

EP  1320680 A1  6/2003
EP  1623111 A1  2/2006
(Continued)

OTHER PUBLICATIONS

Plumley C.E. et al: Supplementing wind turbine pitch control with a trailing edge flap smart rotor, 3rd Renewable Power Generation Conference ( RPG 2014). pp. 8.34-8.34, XP055343775, DOI: 10.1049/cp.2014.0919 ISBN: 978-1-84919-917-9, Abstract; Sections 2-6; the whole document; 2014.
(Continued)

*Primary Examiner* — Pedro J Cuevas
(74) *Attorney, Agent, or Firm* — Schmeiser, Olsen & Watts LLP

(57) ABSTRACT

Provided is a device and a method of damping front and backward movements of a tower of a wind turbine, wherein the wind turbine includes the tower and a rotor, the rotor being mounted at the top of the tower to rotate about a rotational axis in which the front and backward movements of the tower occur, and the rotor has a plurality of blades, wherein each blade has at least one corresponding active add-on member which is actuated by a corresponding actuator to alter aerodynamic properties of the blade. Each add-on member is actuated by the corresponding actuator to alter the aerodynamic properties of the blade in a manner that the
(Continued)

rotor is configured to damp the front and backward movements of the tower of the wind turbine.

12 Claims, 3 Drawing Sheets

(56) References Cited

U.S. PATENT DOCUMENTS

| | | | | |
|---|---|---|---|---|
| 6,672,837 B1* | 1/2004 | Veldkamp | ................. | F16F 7/10 |
| | | | | 416/500 |
| 7,400,055 B2* | 7/2008 | Nagao | .................... | F03D 7/042 |
| | | | | 290/55 |
| 7,692,322 B2* | 4/2010 | Wakasa | .................... | F03D 9/25 |
| | | | | 290/55 |
| 8,026,623 B2* | 9/2011 | Wakasa | .................... | F03D 9/25 |
| | | | | 290/55 |
| 8,044,529 B2* | 10/2011 | Egedal | ................. | F03D 7/0276 |
| | | | | 290/55 |
| 8,115,331 B2* | 2/2012 | Wakasa | .................. | F03D 7/043 |
| | | | | 290/55 |
| 8,242,617 B2* | 8/2012 | Bjerge | ................. | F03D 7/0272 |
| | | | | 290/44 |
| 8,299,643 B2* | 10/2012 | Wakasa | ................. | F03D 7/0296 |
| | | | | 290/55 |
| 8,395,273 B2* | 3/2013 | Wakasa | .................. | F03D 7/043 |
| | | | | 290/55 |
| 8,482,143 B2* | 7/2013 | Drossel | ................. | F03D 7/0296 |
| | | | | 290/55 |
| 8,546,968 B2* | 10/2013 | Wakasa | ..................... | F03D 9/25 |
| | | | | 290/55 |
| 9,273,671 B2* | 3/2016 | Hernandez Mascarell | ................. | |
| | | | | F03D 17/00 |
| 9,347,431 B2* | 5/2016 | Esbensen | ................. | F03D 9/25 |
| 9,909,562 B2* | 3/2018 | Baek | ................. | F03D 7/043 |
| 10,415,548 B2* | 9/2019 | Caponetti | ................. | F03D 9/25 |
| 10,590,912 B2* | 3/2020 | Caponetti | ................. | F03D 9/255 |
| 10,619,623 B2* | 4/2020 | Caponetti | ................. | F03D 7/024 |
| 10,934,997 B2* | 3/2021 | Egedal | ................. | F03D 7/0296 |
| 10,982,651 B2* | 4/2021 | Caponetti | ................. | F03D 7/042 |
| 11,098,695 B2* | 8/2021 | Nielsen | ................. | F03D 17/00 |
| 11,215,163 B2* | 1/2022 | Caponetti | ................. | F03D 7/0224 |
| 11,293,401 B2* | 4/2022 | Caponetti | ................. | F03D 7/0224 |
| 11,319,925 B2* | 5/2022 | Caponetti | ................. | F03D 7/0296 |
| 11,421,652 B2* | 8/2022 | Thomsen | ................. | F03D 7/0296 |
| 2009/0250932 A1* | 10/2009 | Egedal | ................. | F03D 7/0276 |
| | | | | 290/44 |
| 2009/0263245 A1* | 10/2009 | Shi | ................. | F03D 7/02 |
| | | | | 73/862.08 |
| 2010/0013235 A1* | 1/2010 | Bjerge | ................. | F03D 7/0296 |
| | | | | 290/55 |
| 2010/0074749 A1* | 3/2010 | Garrido | ................. | F03D 7/0296 |
| | | | | 416/61 |
| 2010/0111693 A1* | 5/2010 | Wilson | ................. | F03D 13/20 |
| | | | | 416/31 |
| 2012/0043758 A1* | 2/2012 | Esbensen | ................. | G01H 1/006 |
| | | | | 702/56 |
| 2013/0001945 A1* | 1/2013 | Hernandez Mascarell | ................. | |
| | | | | F03D 17/00 |
| | | | | 702/56 |
| 2014/0003936 A1* | 1/2014 | Agarwal | ................. | F03D 7/0276 |
| | | | | 416/1 |
| 2014/0334928 A1* | 11/2014 | Baek | ................. | F03D 7/043 |
| | | | | 416/1 |
| 2014/0339827 A1* | 11/2014 | Esbensen | ................. | F03D 7/0204 |
| | | | | 290/44 |
| 2015/0003984 A1* | 1/2015 | Pineda Amo | ................. | F03D 7/0224 |
| | | | | 416/43 |
| 2015/0076822 A1* | 3/2015 | Creaby | ................. | F03D 7/0276 |
| | | | | 290/44 |
| 2015/0211487 A1* | 7/2015 | Dixon | ................. | F03D 7/0232 |
| | | | | 416/23 |
| 2015/0322916 A1* | 11/2015 | Zamora Rodriguez | ................. | |
| | | | | F03D 80/00 |
| | | | | 416/247 R |
| 2016/0377058 A1* | 12/2016 | Caponetti | ................. | F03D 7/0224 |
| | | | | 416/1 |
| 2018/0045181 A1 | 2/2018 | Taylor et al. | | |
| 2018/0066630 A1* | 3/2018 | Kristoffersen | ................. | F03D 7/0296 |
| 2019/0055923 A1* | 2/2019 | Caponetti | ................. | F03D 80/80 |
| 2019/0277256 A1* | 9/2019 | Egedal | ................. | H02P 9/008 |
| 2020/0088165 A1* | 3/2020 | Nielsen | ................. | F03D 7/0224 |
| 2020/0158084 A1* | 5/2020 | Caponetti | ................. | F03D 9/25 |
| 2021/0156357 A1* | 5/2021 | Caponetti | ................. | F03D 7/043 |
| 2021/0164441 A1* | 6/2021 | Caponetti | ................. | F03D 7/0276 |
| 2021/0207584 A1* | 7/2021 | Hammerum | ................. | F03D 7/0296 |
| 2021/0231102 A1* | 7/2021 | Thomsen | ................. | F03D 7/0296 |
| 2021/0277869 A1* | 9/2021 | Vasudevan | ................. | F03D 7/0296 |
| 2022/0025861 A1* | 1/2022 | Egedal | ................. | F03D 7/0224 |
| 2022/0112879 A1* | 4/2022 | Wei | ................. | F03D 13/20 |
| 2022/0154689 A1* | 5/2022 | Von Aswege | ................. | F03D 7/0224 |

FOREIGN PATENT DOCUMENTS

| | | | | |
|---|---|---|---|---|
| EP | 1719910 A1 | 11/2006 | | |
| EP | 2166222 A2 * | 3/2010 | ........... | F03D 7/0296 |
| EP | 2995811 A1 | 3/2016 | | |
| EP | 3290688 A1 | 3/2018 | | |
| EP | 3577338 A1 | 12/2019 | | |
| EP | 3577339 A1 | 12/2019 | | |
| ES | 2927211 T3 * | 11/2022 | ........... | F03D 7/0272 |
| WO | 2010023278 A2 | 3/2010 | | |
| WO | 2010084131 A2 | 7/2010 | | |
| WO | 2018041420 A1 | 3/2018 | | |
| WO | 2018054439 A1 | 3/2018 | | |
| WO | 2018095496 A1 | 5/2018 | | |
| WO | WO-2018077530 A1 * | 5/2018 | ........... | F03D 7/0272 |

OTHER PUBLICATIONS

International Search Report and Written Opinion of the International Searching Authority dated Jan. 28, 2020 for Application No. PCT/EP2019/079816.
European Search Report and Written Opinion of the European Searching Authority dated Jun. 12, 2019 for Application No. 18212389.3.

* cited by examiner

DEVICE AND METHOD OF DAMPING FRONT AND BACKWARD MOVEMENTS OF A TOWER OF A WIND TURBINE

CROSS-REFERENCE TO RELATED APPLICATIONS

This application claims priority to PCT Application No. PCT/EP2019/079816, having a filing date of Oct. 31, 2019, which is based off of EP Application No. 18212389.3, having a filing date of Dec. 13, 2018, the entire contents both of which are hereby incorporated by reference.

FIELD OF TECHNOLOGY

The following relates to a device and a method of damping front and backward movements of a tower of a wind turbine.

BACKGROUND

Active tower damping reduces the tower oscillations by applying appropriate pitch angle changes. The pitch angle is an angle which is measured about a longitudinal axis of each blade. An appropriate change in the pitch angle changes the aerodynamic properties of the blade so that the tower oscillations can be dampened. This reduces the bending loads of the tower and the tower base. However, pitch activity and pitch bearing damages will increase, since additional pitching is required for damping the tower oscillations in addition to the ordinary pitching operation. If a pitch system capacity and/or a pitch bearing capacity are an issue for a certain wind turbine designs, particularly for large and heavy blades or other constraints, the tower damping can hardly be achieved by the pitch system.

EP 1 320 680 A1 discloses flaps which are mounted to a blade of a wind turbine rotor. The flaps change an airflow to regulate a rotation speed of the rotor.

SUMMARY

An aspect relates to a device and a method of damping front and backward movements of a tower of a wind turbine which take the rotor and blade constraints into account.

According to a first aspect of embodiments of the invention, a method of damping front and backward movements of a tower of a wind turbine is provided, wherein the wind turbine comprises the tower and a rotor, the rotor being mounted at the top of the tower to rotate about a rotational axis in which the front and back-ward movements of the tower occur, and the rotor has a plurality of blades, wherein each blade has at least one corresponding active add-on member which is actuated by a corresponding actuator to alter aerodynamic properties of the blade. Each add-on member is actuated by the corresponding actuator to alter the aerodynamic properties of the blade in a manner that the rotor is configured to damp the front and backward movements of the tower of the wind turbine.

Advantageously, a pitch system is basically not necessarily involved in the damping so that the constraints of the pitch system or the blade are not relevant anymore for the inventive method. The active add-on members can reduce structural loads (primarily tower and foundation loads), and the pitch system (e.g., hydraulics) is not stressed. Pitch bearing damages can thus be avoided.

The add-on members will lower the thrust of the rotor when they are activated (similar to pitching the blade towards feather will lower the thrust in the traditional set up). Hence, if the add-on members are activated when the tower is to move backwards, thrust can be reduced, and the tower will not sway that much backwards, which will reduce the oscillations. Similarly, when the tower is to be pushed forwards, the add-on members can be activated to increase the thrust to fight against the movement of the tower oscillation.

The method comprises the following steps: a) measuring a time signal which represents a front and backward acceleration, velocity or position of the tower or the nacelle; b) filtering the time signal to extract at least one frequency component; and c) generating an actuating signal for each actuator based on the at least one extracted frequency component and supplying the actuating signals to the actuators to actuate the corresponding add-on member.

The step b) can further comprises at least one of the following substeps: compensating a phase of the time signal for the at least one filtered frequency component and applying gains to obtain individual actuating signals for each actuator to act on the at least one frequency component.

The active tower damping function reduces loads on the tower base resulting from the front and backward movements by applying an offset to the active add-on members. The damping signal to the actuators can be a function of the tower acceleration signal. The damping signal contains the frequency content of the dominant tower movement (the first tower eigen mode).

The damping signal can have an optimal phase at the first tower eigen mode such that the active add-on members will apply a thrust change that will dampen the tower oscillation. For example, the tower oscillations are triggered when a rotating blade passes the tower. Thereby, the air pressure between that blade and the tower is suddenly changed so that the tower oscillations are triggered. Since the phase of the tower oscillation is determined, the actuator of each blade is actuated in a correct timing.

The offset of the add-on members (since this will be added to existing controller outputs for active add-on members) can be calculated based on the measured forward and backward acceleration of the tower (or the nacelle), and is conducted in the following steps: 1) measuring the forward and backward acceleration of nacelle or tower top, 2) filtering the acceleration signal to ensure a) that relevant frequency component(s) is/are passed through, otherwise dampened; and b) that a phase at the dominant movement (first tower eigen frequency) is taken into account to ensure that the tower oscillations are correctly dampened by respective add-on members.

More desired, step of applying gains comprises a sub step of limiting the activation signals within upper and/or lower bounds. Thereby, the actuating signal can be saturated to ensure that the offset is within desired limits that respect the capacity of the add-on members and the desired usage range.

More desired, step b) is performed using at least one of a low-pass filter and a bandpass filter. The low-pass filter can act to change the phase of the signal (tuned to adjust it sufficiently at the tower frequency), while the bandpass filter can pass through only the first tower eigen frequency (i.e., the dominant movement).

More desired, the step of compensating a phase of the time signal is performed using a transfer function between the measured acceleration and a rotor thrust change to compensate for possible communication delays, actuator dynamics and aerodynamics. Obtaining the correct phase can depend on the transfer function between measured acceleration and rotor thrust change, including possible communication delays, actuator dynamics, actuator delays, sensor delays, system delays, aerodynamics, etc.

More desired, the gains in the step of applying gains have fixed values. The gains are applied to convert the acceleration signal into an appropriate activation of the active add-on member. Alternatively, the gains in the step of applying gains have variable values which are determined based on a sensitivity of the corresponding active add-on member at a certain operating point, and/or which apply a damping only at a selected operating point. The gain can be scheduled by relevant operational parameters to include sensitivity of the active add-on at a certain operating point, or the gain can be scheduled to apply the damping only at selected operating points, e.g. only in certain operating regions, if an additional activation of actuators is not desired for some operating points.

Each blade is movable to alter a pitch angle thereof, and the active add-on member of each blade is moved by the corresponding actuator based on the actuating signal while a pitch angle of the same blade is kept unchanged. Thereby, the pitch system is not stressed at all.

Each blade is movable to alter a pitch angle thereof, and the active add-on member of each blade is moved by the corresponding actuator based on the actuating signal which takes a pitch angle of the same blade into account. Thereby, the pitch system is not necessarily to be switched-off, but it is not stressed by the dampening operation of the add-on members.

Each blade is movable to alter a pitch angle thereof, and the pitch angle is determined by taking the actuating signal of the corresponding actuator into account. For example, at low tower frequencies or floating foundations (having a low frequency as well), where the system frequency is so low that it will interfere with the speed/pitch controllers, the activation of the add-on members could have an opposite impact, as the resulting pitch angle will change the thrust with the opposite sign. However, this embodiment combines the pitch angle and add-on member activations, where the power and speed will be the same, but the rotor thrust will vary.

According to a second aspect of embodiments of the invention, a device for damping front and backward movements of a tower of a wind turbine is provided, wherein the wind turbine comprises the tower and a rotor, the rotor being mounted at the top of the tower to rotate about a rotational axis in which the front and back-ward movements of the tower occur, and the rotor has a plurality of blades, wherein each blade has at least one corresponding active add-on member which is actuated by a corresponding actuator to alter aerodynamic properties of the blade. Each add-on member is actuated by the corresponding actuator to alter the aerodynamic properties of the blade in a manner that the rotor is configured to damp the front and backward movements of the tower of the wind turbine.

The device further comprises: a measuring device configured to measure a time signal which represents a front and backward acceleration, velocity or position of the tower or the nacelle, a filtering device configured to filter the time signal to extract at least one frequency component, and a generating and supplying device configured to generate an actuating signal for each actuator based on the at least one extracted frequency component and to supply the actuating signals to the actuators to actuate the corresponding add-on member.

The filtering device further comprises at least one of a compensating device configured to compensate a phase of the time signal for the at least one filtered frequency component, and an applying device configured to apply gains to obtain individual actuating signals for each actuator to act on the at least one frequency component.

More desired, the applying device is configured to limit the activation signals within upper and/or lower bounds.

More desired, the filtering device comprises at least one of a low-pass filter and a bandpass filter.

More desired, the determining device is configured to use a transfer function between the measured acceleration and a rotor thrust change to compensate for possible communication delays, actuator dynamics, actuator delays, sensor delays, system delays, and aerodynamics.

More desired, the gains have fixed values. Alternatively, the gains have variable values which are determined based on a sensitivity of the corresponding active add-on member at a certain operating point, and/or which applies a damping only at a selected operating point.

Each blade is movable to alter a pitch angle thereof, and the active add-on member of each blade is moved by the corresponding actuator based on the actuating signal while a pitch angle of the same blade is kept unchanged.

Each blade is movable to alter a pitch angle thereof, and the active add-on member of each blade is moved by the corresponding actuator based on the actuating signal which takes a pitch angle of the same blade into account.

Each blade is movable to alter a pitch angle thereof, and the pitch angle is determined by taking the actuating signal of the corresponding actuator into account.

BRIEF DESCRIPTION

Some of the embodiments will be described in detail, with reference to the following figures, wherein like designations denote like members, wherein.

DETAILED DESCRIPTION

Figure 1:
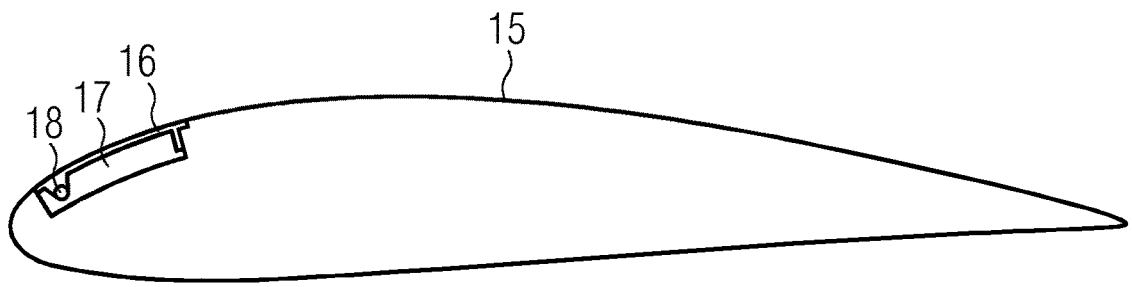
FIG. 1 shows a wind turbine blade having an add-on member.

The illustrations in the drawings are schematically. It is noted that in different figures, similar or identical elements are provided with the same reference signs.

FIG. 1 shows a wind turbine blade 15 of a wind turbine (not shown). The wind turbine comprises a tower and a rotor, wherein the rotor is mounted at the top of the tower to rotate about a rotational axis. In more detail, the rotor is mounted to a hub which in turn is mounted to a nacelle. The nacelle is mounted to the tower. The rotor has a plurality of the blades 15. Each blade 15 has an active add-on member 17 which is actuated by an actuator to alter aerodynamic properties of the blade 15.

Via the blades 15, the rotor applies a thrust force to the tower so that front and backward movements of the tower and a nacelle of the tower occur.

Each add-on member 17 is actuated by the corresponding actuator to alter the aerodynamic properties of the blade 15 in a manner that the rotor is configured to damp the front and backward movements of the tower of the wind turbine. That is, by changing the aerodynamic properties of the blades 15, a thrust force from the rotor to the tower is appropriately changed to counteract against the front and backward movements of the tower.

The add-on member 17 is designed as a spoiler. The spoiler 17 is here arranged near the front edge of the blade 15 but can also be arranged near the back edge of the blade 15. The add-on member 17 is accommodated in a recess 16 in the blade 15 and can turn about a hinge 18 by activation of the actuator. In FIG. 1, the spoiler 17 is shown in its normal deactivated position, where no spoiler effect and no stall is desired.

Figure 2:
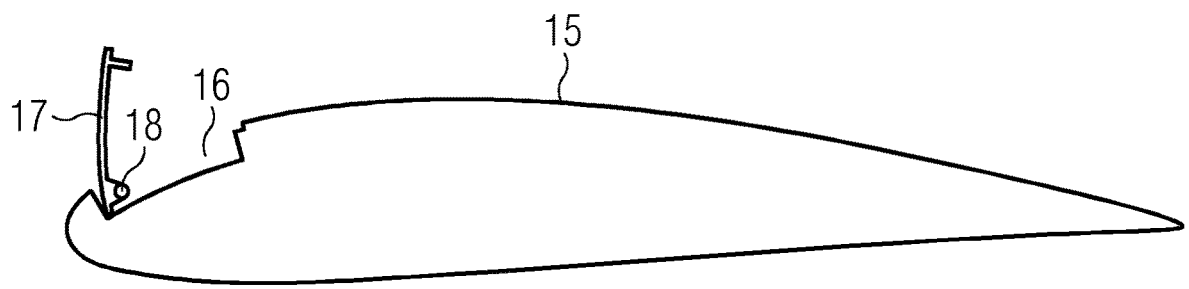
FIG. 2 shows the same add-on member in an activated position, where the add-on member is turned to maximum stalling effect.

FIG. 2 shows the same add-on member 17 in an activated position, where the add-on member 17 is turned to a maximum by the actuator so that the stalling effect is maximum.

According to embodiments of the present invention, the add-on member 17 is not necessarily to be formed as a spoiler. The add-on member 17 can have any other configuration which is able to alter the aerodynamic properties of the blade 15.

Figure 3:
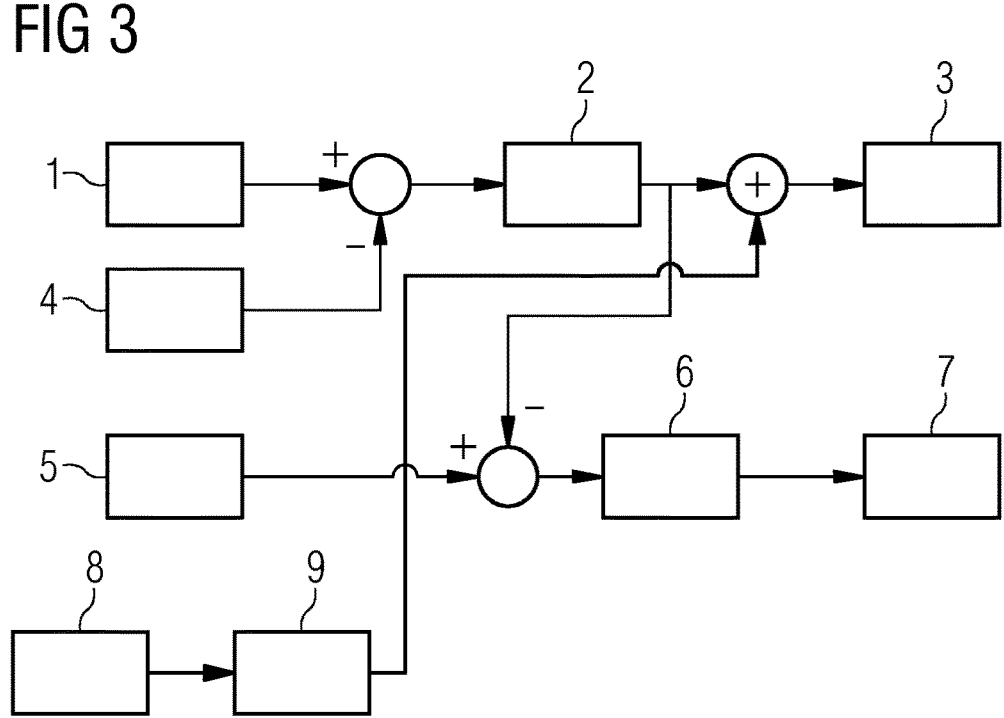
FIG. 3 shows an implementation of the method of damping front and backward movements of a tower of a wind turbine according to a first embodiment.

FIG. 3 shows an implementation of the method of damping front and backward movements of a tower of a wind turbine according to a first embodiment.

Reference 1 designates a rotor speed reference; reference sign 2 designates a speed trim stall controller; reference sign 3 designates a trim stall system; reference sign 4 designates the rotor speed; reference sign 5 designates a trim stall reference; reference sign 6 designates a trim stall pitch controller; reference sign 7 designates a pitch system; reference sign 8 designates a tower acceleration; and reference sign 9 designates a tower trim stall controller.

A front and backward acceleration of the tower is measured to obtain the tower acceleration 8. The tower acceleration 8 is input in the tower trim stall controller 9. Alternatively, a front and backward velocity of the tower or even a position of the tower in the front and backward direction can be measured instead of the acceleration.

In the tower trim stall controller 9, the time signal is filtered to extract at least one frequency component. The filtering can be performed by using at least one of a low-pass filter and a bandpass filter. The filtering is achieved by a bandpass filter and then optionally by a low pass filter to compensate the phase, and as a secondary objective to further attenuate noise. Optionally, a time delay and/or a lead-lag filter can be further provided. The used filter works on the time series (for example for the measured tower or nacelle acceleration signal) and is designed to have a characteristic which aim to output a particular frequency (the tower mode) such that it has a high amplitude (level) and the correct phase (time lead/lag) for damping purposes.

Thereby, a phase of the time signal for the at least one filtered frequency component can be compensated. To compensate for possible communication delays, actuator dynamics, actuator delays, sensor delays, system delays and aerodynamics, etc., the phase can be compensated for by use a transfer function between the measured acceleration and a rotor thrust change.

Thereafter, gains are applied to obtain individual actuating signals for each actuator to act on the at least one frequency component. The individual actuating signals are then supplied to the actuators of the add-on member 17 of each blade 15. The gains can be determined such that the activation signals are limited within upper and/or lower bounds. The gains are applied to the time signal, so it will in principle be applied to all frequencies present in the signal. However, the filter is usually set such that mainly the tower frequency will exist in the signal.

The gains can either have a fixed value or a variable value. The variable value can be determined based on a sensitivity of the active add-on member 17 at a certain operating point. The variable value can apply a damping only at a selected operating point.

The thus generated actuating signals are supplied from the trim stall controller 9 to the trim stall system 3. The trim stall system 3 comprises the active add-on members 17 and the actuators of each blade 15. Each actuator is operated based on the supplied, associated actuating signal so that the active add-on members 17 are actuated by the actuators to alter the aerodynamic properties of the corresponding blades 15.

In the first embodiment, a difference between the rotor speed reference 1 and the rotor speed 4 is input in the speed trim stall controller 2. The output of the speed trim stall controller 2 is input in the trim stall system 3 together with the actuating signal which is output from the trim stall controller 9 as described above. The actuators of the add-on members 17 of each blade 15 therefore also take the rotor speed into account.

Further, a difference between an output from the speed trim stall controller 2 and the trim stall reference 5 is input into the trim stall pitch controller 6. An output of the trim stall pitch controller 6 is input in the pitch system 7. The pitch system 7 comprises a pitch actuator to change a pitch angle of the corresponding blade 15. The pitch angle is an angle of the blade 15 which is measured about the longitudinal axis of the blade 15.

In embodiments of the present invention, the front and backward movements of a tower of a wind turbine are exclusively dampened by the separate trim stall system 3, wherein the pitch system 7 is not involved herein. This is particularly an advantage where large and heavy blades 15 are used because the pitch system 7 is focused mainly on the pitching and not overstrained by the trim stall work as an additional task. As a result, pitch activity and pitch bearing damages can be avoided.

Figure 4:
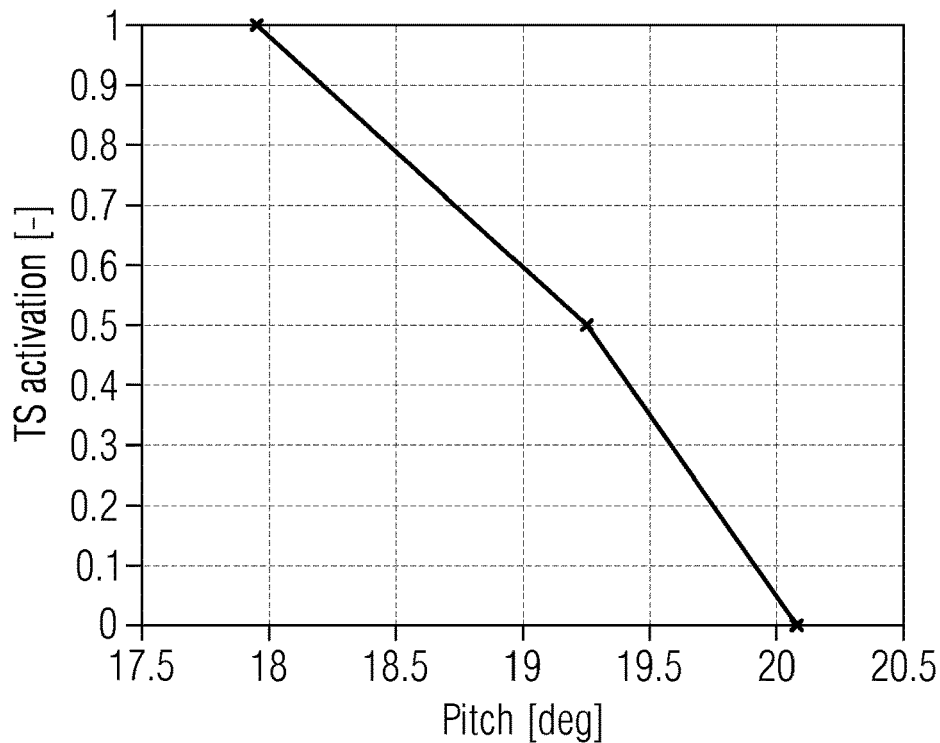
FIG. 4 shows a relationship between pitch and trim stall activations.
Figure 5:
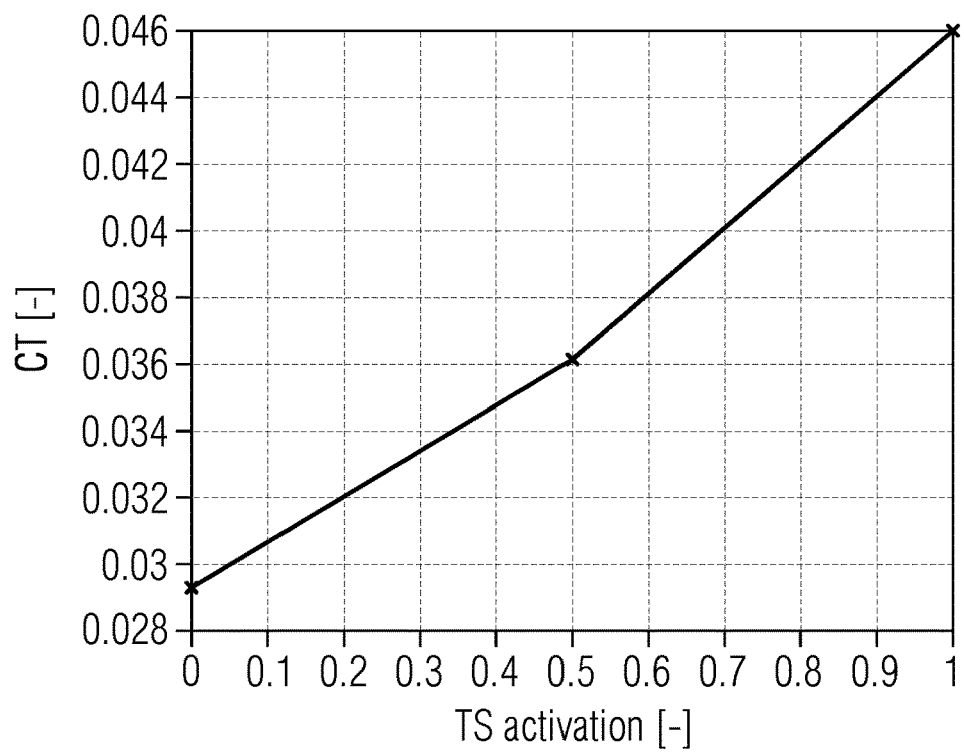
FIG. 5 shows a relation between the thrust coefficient (Ct) and the trim stall activation, where the pitch angle will vary according to FIG. 4.

FIG. 4 shows a relationship between pitch and trim stall activations, and FIG. 5 shows a relation between the thrust coefficient (Ct) and the trim stall activation, where the pitch angle will vary according to FIG. 4.

For very low tower frequencies or floating foundations (having a low frequency as well), where the system frequency is so low that it will interfere with the speed and pitch controllers, the activation of trim stall system 3 will have the opposite impact, as the resulting pitch angle will change the thrust with the opposite sign.

Hence, it shall be exploited that there is a combination of a pitch angle activation and a trim stall activation, where the power and speed will be the same, but the rotor thrust will vary.

Figure 6:
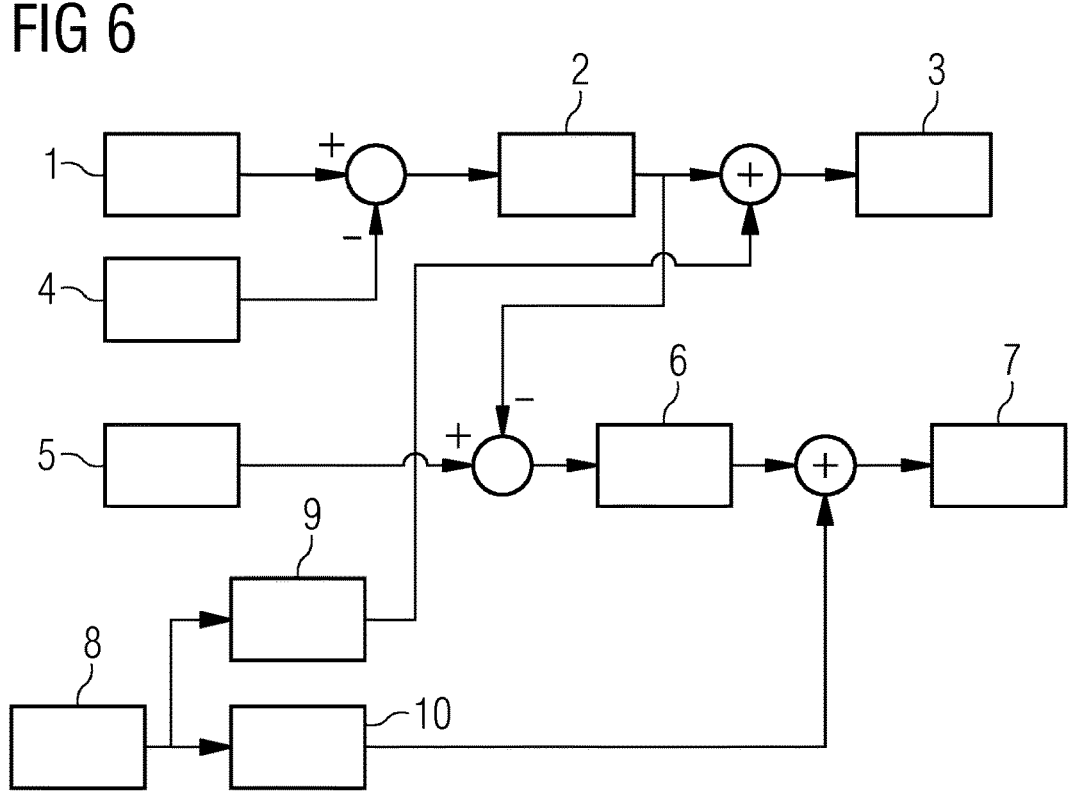
FIG. 6 shows an implementation of the method of damping front and backward movements of a tower of a wind turbine according to a second embodiment.

FIG. 6 shows a corresponding implementation of the method of damping front and backward movements of a tower of a wind turbine according to a second embodiment which is suitable for these very low tower frequencies or floating foundations. The same elements of the first embodiment of FIG. 3 are designated by the same reference signs. In the second embodiment, a trim stall reference and a pitch reference are generally calculated as a function of the tower/nacelle accelerations.

In more detail, a front and backward acceleration of the tower is measured to obtain the tower acceleration 8. The tower acceleration 8 is input in the tower trim stall controller 9.

In the tower trim stall controller 9, at least one frequency component from the measured acceleration is filtered, and a phase of the at least one filtered frequency component is determined. Thereafter, gains are applied on the at least one filtered frequency component having the determined phase to obtain actuating signals for each add-on member 17.

The actuating signal is supplied from the trim stall controller 9 to the trim stall system 3.

In the second embodiment, a difference between the rotor speed reference 1 and the rotor speed 4 is input in the speed trim stall controller 2. The output of the speed trim stall controller 2 is input in the trim stall system 3 together with the actuating signal which is output from the trim stall controller 9 as described above. The actuators of the add-on members 17 of each blade 15 therefore also take the rotor speed into account.

The trim stall system 3 comprises the active add-on members 17 and the actuators of each blade 15. Each actuator is operated based on the supplied actuating signal so that the active add-on member 17 is actuated by the actuator to alter the aerodynamic properties of the corresponding blade 15.

Further, a difference between an output from the speed trim stall controller 2 and the trim stall reference 5 is input into the trim stall pitch controller 6. An output of the trim stall pitch controller 6 is input in the pitch system 7. The pitch system 7 comprises a pitch actuator to change a pitch angle of the corresponding blade 15. The pitch angle is an angle of the blade 15 which is measured about the longitudinal axis of the blade.

In the second embodiment, the measured tower acceleration 8 is additionally input in a tower pitch controller 10. The output of the tower pitch controller 10 is input in the pitch system 7 together with the output of the above-described trim stall pitch controller 6.

In the second embodiment, the tower acceleration 8 is taken into account into the pitch reference so that the pitch system 7 assists the dampening of the front and backward movements of the tower.

Figure 7:
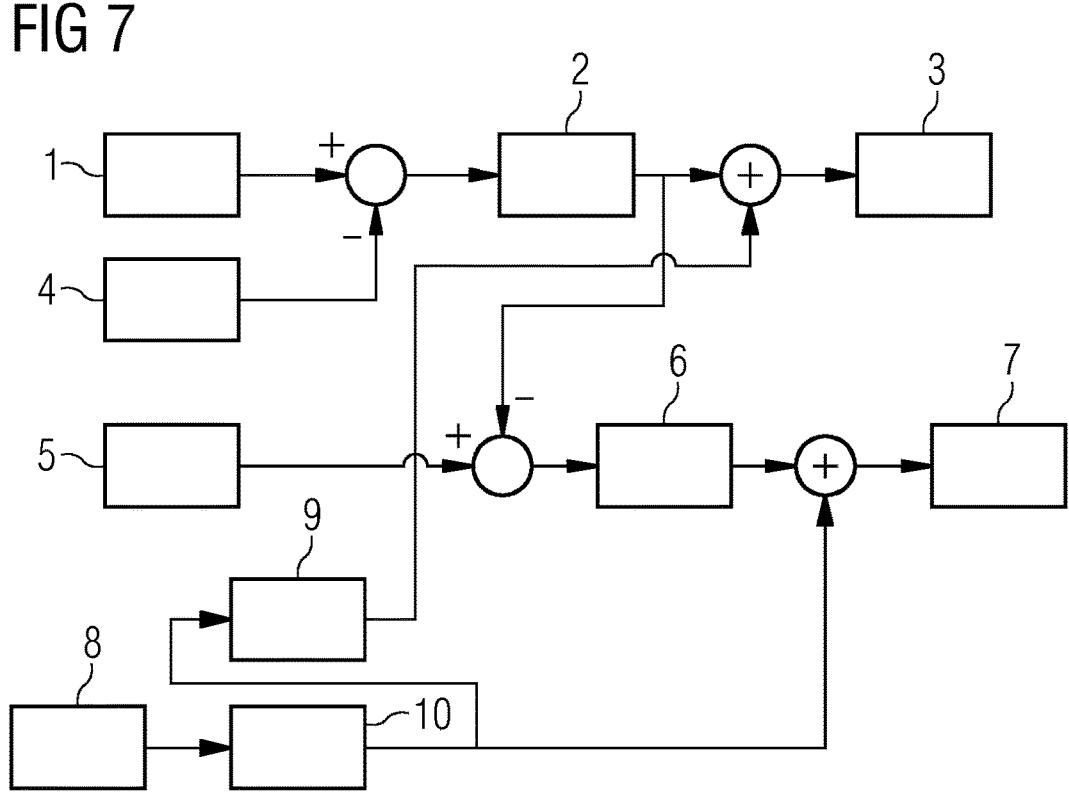
FIG. 7 shows an implementation of the method of damping front and backward movements of a tower of a wind turbine according to a third embodiment.

FIG. 7 shows an implementation of the method of damping front and backward movements of a tower of a wind turbine according to a third embodiment. The same elements of the second embodiment of FIG. 6 are designated by the same reference signs. The third embodiment is an alternative of the second embodiment. In the third embodiment, the trim stall part of the damping is calculated as a function of the pitch part of the damping.

A front and backward acceleration of the tower is measured to obtain the tower acceleration 8. The tower acceleration 8 is input in the tower pitch controller 10. An output of the tower pitch controller 10 is input in the tower trim stall controller 9.

In the tower trim stall controller 9, at least one frequency component from the measured acceleration is filtered, and a phase of the at least one filtered frequency component is determined. Thereafter, a gain is applied on the at least one filtered frequency component having the determined phase to obtain an actuating signal. In the third embodiment, the filtering process and/or the application of the gain is performed considering the output of the tower pitch controller 10.

The actuating signal is supplied from the trim stall controller 9 to the trim stall system 3. The trim stall system 3 comprises the active add-on members 17 and the actuators of each blade 15. Each actuator is operated based on the supplied actuating signal so that the active add-on member 17 is actuated by the actuator to alter the aerodynamic properties of the corresponding blade 15.

In the third embodiment, a difference between the rotor speed reference 1 and the rotor speed 4 is input in the speed trim stall controller 2. The output of the speed trim stall controller 2 is input in the trim stall system 3 together with the actuating signal which is output from the trim stall controller 9 as described above. The actuators of the add-on members 17 of each blade 15 therefore also take the rotor speed into account.

Further, a difference between an output from the speed trim stall controller 2 and the trim stall reference 5 is input into the trim stall pitch controller 6. An output of the trim stall pitch controller 6 is input in the pitch system 7. The pitch system 7 comprises a pitch actuator to change a pitch angle of the corresponding blade 15. The pitch angle is an angle of the blade 15 which is measured about the longitudinal axis of the blade 15.

The output of the tower pitch controller 10 is input in the pitch system 7 together with the output of the trim stall pitch controller 6 as described above.

In the third embodiment, the trim stall reference is also determined based on the pitch control.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of damping front and backward movements of a tower of a wind turbine, wherein the wind turbine comprises the tower and a rotor, the rotor being mounted at the top of the tower to rotate about a rotational axis in which the front and backward movements of the tower occur, and the rotor has a plurality of blades, wherein each blade has at least one corresponding active add-on member which is actuated by a corresponding actuator to alter aerodynamic properties of the blade;

wherein each add-on member is actuated by the corresponding actuator to alter the aerodynamic properties of the blade in a manner that the rotor is configured to damp the front and backward movements of the tower of the wind turbine, wherein the method comprises the following steps:
   a) measuring a time signal which represents a front and backward acceleration, velocity or position of the tower or a nacelle mounted to the tower;
   b) extracting at least one frequency component by filtering the time signal; and
   c) generating an actuating signal for each actuator based on the at least one extracted frequency component and supplying the actuating signals to the actuators to actuate the corresponding add-on member, and wherein the filtering the time signal in step b) further comprises the following sub step:
applying gains to obtain individual actuating signals for each actuator to act on the at least one frequency component, wherein the gains have variable values which are determined based on a sensitivity of the corresponding active add-on member at a certain operating point and which apply a damping only at a selected operating point.

2. The method according to claim 1, wherein step b) further comprises the following sub step:
compensating a phase of the time signal for the at least one filtered frequency component.

3. The method according to claim 2, wherein the step of compensating a phase of the time signal includes compensating for communication delays, actuator dynamics, actuator delays, sensor delays, system delays, and aerodynamics, and is performed using a transfer function between the measured acceleration and a thrust change of the rotor.

4. The method according to claim 1, wherein the step of applying gains comprises a sub step of limiting the activation signals within upper and/or lower bounds.

5. The method according to claim 1, wherein step b) is performed using a bandpass filter and subsequently a low-pass filter.

6. The method according to claim 1, wherein
each blade is movable to alter a pitch angle thereof; and
the active add-on member of each blade is moved by the corresponding actuator based on the actuating signal while a pitch angle of the same blade is kept unchanged.

7. The method according to claim 1, wherein
each blade is movable to alter a pitch angle thereof; and
the active add-on member of each blade is moved by the corresponding actuator based on the actuating signal which takes a pitch angle of the same blade into account.

8. The method according to claim 1, wherein
each blade is movable to alter a pitch angle thereof; and
the pitch angle is determined by taking the actuating signal of the corresponding actuator into account.

9. A device for damping front and backward movements of a tower of a wind turbine, wherein the wind turbine comprises the tower and a rotor, the rotor being mounted at the top of the tower to rotate about a rotational axis in which the front and backward movements of the tower occur, and the rotor has a plurality of blades, wherein each blade has at least one corresponding active add-on member which is actuated by a corresponding actuator to alter aerodynamic properties of the blade;
wherein each add-on member is actuated by the corresponding actuator to alter the aerodynamic properties of the blade in a manner that the rotor is configured to damp the front and backward movements of the tower of the wind turbine,
wherein the device further comprises:
a measuring device configured to measure a time signal which represents a front and backward acceleration, velocity or position of the tower or a nacelle mounted to the tower;
a filtering device configured to extract at least one frequency component by filtering the time signal; and
a generating and supplying device configured to generate an actuating signal for each actuator based on the at least one extracted frequency component and to supply the actuating signals to the actuators to actuate the corresponding add-on member, and
wherein the filtering device further comprises:
an applying device configured to apply gains to obtain individual actuating signals for each actuator to act on the at least one frequency component, wherein the gains have variable values which are determined based on a sensitivity of the corresponding active add-on member at a certain operating point and which apply a damping only at a selected operating point.

10. The device according to claim 9, wherein the filtering device further comprises:
a compensating device configured to compensate a phase of the time signal for the at least one filtered frequency component.

11. The device according to claim 10, wherein the filtering device comprises a low-pass filter and a bandpass filter, the filtering device configured to use the low-pass filter subsequent to the bandpass filter.

12. The device according to claim 9, wherein the filtering device comprises a low-pass filter and a bandpass filter, the filtering device configured to use the low-pass filter subsequent to the bandpass filter.

* * * * *